United States Patent
Dolan

(10) Patent No.: US 6,697,539 B1
(45) Date of Patent: Feb. 24, 2004

(54) IMAGE SCALING BY EXACT 2D IMPLICIT POLYNOMIALS

(75) Inventor: John Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/539,353

(22) Filed: Mar. 31, 2000

(51) Int. Cl.[7] .................................................. G06K 9/32
(52) U.S. Cl. ...................... 382/298; 382/236; 382/294; 382/295
(58) Field of Search ................................. 382/298, 294, 382/236, 295, 300; 348/384.1, 443, 131; 600/443, 453, 454, 455

(56) References Cited

U.S. PATENT DOCUMENTS

| | | | |
|---|---|---|---|
| 4,193,092 A | 3/1980 | Stoffel | 358/136 |
| 4,578,812 A | 3/1986 | Yui | 382/41 |
| 5,007,752 A | 4/1991 | Yasumi et al. | 400/636 |
| 5,008,752 A | 4/1991 | Van Nostrand | 358/160 |
| 5,551,137 A | 9/1996 | Davis | 29/401.1 |
| 5,671,298 A | 9/1997 | Markandey et al. | 382/298 |
| 5,754,710 A | 5/1998 | Sekine et al. | 382/300 |
| 5,796,879 A | 8/1998 | Wong et al. | 382/300 |
| 5,809,182 A | 9/1998 | Ward et al. | 382/298 |
| 5,831,592 A | 11/1998 | Cahill, III | 345/127 |
| 5,844,541 A | 12/1998 | Cahill, III | 345/127 |
| 5,847,714 A | 12/1998 | Naqvi et al. | 345/439 |

FOREIGN PATENT DOCUMENTS

JP          402001082 A   * 1/1990   ........... G06F/15/72

* cited by examiner

*Primary Examiner*—Anh Hong Do
(74) *Attorney, Agent, or Firm*—Charnoff Vilhauer McClung & Stenzel, LLP

(57) ABSTRACT

A system modifies an image consisting of a plurality of pixels from a first scale to a second scale. The system determines an integer matrix that is independent of the values of the plurality of pixels of the image. The system also determines a first vector for a region of the first scale representative of a surface based on the coordinates of the first scale. Also, the system interpolates pixel locations in the second scale by scaling the coordinates of points of the first scale and computing a scaled second vector. A third vector is determined based, at least in part, upon the product of the first vector and the second vector, where the third vector has uneven scaling of its terms. A plurality of the terms of the third vector based upon a fractional scaling factor related to said uneven scaling and summing the components of the third vector.

35 Claims, 5 Drawing Sheets

| 124 | 125 | 127 | 121 |
| 97  | 127 | 151 | 106 |
| 107 | 143 | 128 | 112 |
| 133 | 125 | 99  | 92  | 125 |

IMAGE SCALING BY EXACT 2D IMPLICIT POLYNOMIALS

BACKGROUND OF THE INVENTION

The present invention relates to digital image scaling.

Digital image processing of images by a computer is a relatively recent development. In its short history, it has been applied to a variety of technical fields with varying degrees of success. The coordinate conversion of a two-dimensional digital data is known as "re-sampling". In order to re-sample the digital input data, data processing techniques such as nearest neighbor interpolation, bilinear interpolation, and interpolation using the cubic convolution method are known.

Image scaling techniques may be differentiated according to the interpolation method used to compute a new value at each scaled location. Of particular interest are those techniques which operate in the spatial domain and employ local, polynomial interpolants. Of these, there are two primary approaches, namely, regional (two-dimensional) interpolants and profile-curve (one-dimensional) interpolants. In either case, the derived polynomial provides image values only for points in the interior to a given 2×2 pixel neighborhood (the domain) of the interpolation. Accordingly, to scale an entire image requires computing individual interpolants for each such neighborhood.

The nearest neighbor interpolation technique is the simplest interpolation scheme, wherein the data of the output pixel (picture element) is taken to be that of the input pixel nearest to the position to which it maps. This interpolation technique, however, introduces a sawtooth effect at the edges of the obtained image. On the other hand, bilinear interpolation obtains the output pixel by interpolating adjacent four-pixel neighborhoods, but still does not provide sufficient contour smoothing. This problem is particularly notable if the geometric operation involves magnification.

Region interpolant techniques typically involve either directly computing an interpolating surface or computing a set of weights based on an underlying set of 2D polynomial equations. In the case of interpolating a surface, the value at an interpolated position is obtained by directly evaluating the surface polynomial at that point. In the case of computing a set of weights, they determine the proportionate contributions of neighboring pixel values to the interpolated value. Techniques involving surface computations can be computationally intensive to compute and evaluate, and increasing in computational complexity as the degree of the polynomial increases. Furthermore, for degree $d \geq 2$, such surfaces may involve over-determined systems. For example, this occurs when a polynomial of degree d is fit to a $(d+1) \times (d+1)$ pixel neighborhood. Referring to FIG. 1, a bicubic surface is fit a representative 4×4 neighborhood. A detail of the surface section corresponding to the central 2×2 neighborhood is shown in FIG. 2 together with exemplary pixel values. The pixel values for the 4×4 neighborhood of FIG. 1 are shown at the bottom, with the central 2×2 neighborhood outlined. The central 2×2 neighborhood outlined in FIG. 1 and shown in FIG. 2 is the only region used to interpolate image values that are to be used for the 2×2 region.

The principal benefit of a surface interpolant is that, once computed, it can provide values for any point interior to its 2×2 region by simply evaluating the surface at that point. In other words, there is no need to compute a new interpolant for other points within the region. However, as previously noted, it is computationally expensive to compute a surface interpolant. In addition, the system may be over-determined resulting in polynomials that do not exactly interpolate the boundary points of their central 2×2 pixel neighborhood. More significantly, the exact boundary interpolation results in interpolants computed for adjacent neighborhoods that do not agree in their common boundary points. Not only do the boundary values for the computed points not agree with one another, they do not even agree with the underlying image points. In other words, the use of the surface interpolant may result in discontinuities at the region boundaries.

To illustrate this effect, FIG. 3 shows the comparison of the surface of FIG. 2 with another surface computed for an adjacent 2×2 neighborhood. For convenience, each surface is displayed in its local coordinate system. However, it may be observed that their common points disagree in value. In particular, the values of 133.91, 120.24 vary significantly from the values of 136.715, 125.385, which should be identical.

One proposed improvement is to use an exactly determined $(d+1)^2 \times (d+1)^2$ system comprised of the four 2×2 boundary pixels, their 1st derivatives, and their cross derivatives. Unfortunately, such a proposal is computationally expensive and inappropriate for a real time system with limited computational capability, such as a digital photocopier.

Referring to FIG. 4, the other principal approach of profile-curve interpolants uses profile curves fitting curves of degree d to corresponding d+1 contiguous pixels along d+1 adjacent rows (or columns). A transverse curve is then fit to corresponding points on the original curves, i.e., points with the identical row (or column) offset. An interpolated value is obtained by evaluating the transverse curve at the proper row (or column) offset. Profile-curve interpolants has the benefit of determining the value of any point along the ab line (aligned with $C_5$) by evaluating transverse curve $C_5$ at the proper offsets. On the other hand, to compute the values of other points in the neighborhood (e.g., c or d) entails fitting a new transverse curve with the appropriate offset along base curves ($C_1$, $C_2$, $C_3$, $C_4$) and evaluating that new curve at the corresponding point position. Moreover, to evaluate any point in region $R_2$ involves a number of additional steps: fitting a new base curve to the four pixels to the right of curve $C_4$; fitting a new transverse curve to the base curves at the appropriate offset; and evaluating the new transverse curve at the corresponding point position. Finally, to evaluate any point in region $R_3$ involves fitting four new base curves now centered on $R_3$; fitting a new transverse curve; and evaluating the transverse curve at the appropriate position. Unfortunately, the profile-curve interpolants are not well suited to transformations that are not axis-aligned (e.g., rotation, shearing, or warping), since the interpolation along the base curves will rarely produce actual output values.

SUMMARY OF THE INVENTION

The present invention overcomes the aforementioned drawbacks of the prior art by providing a system for modifying an image consisting of a plurality of pixels from a first scale to a second scale. The system determines an integer matrix that is independent of the values of the plurality of pixels of the image. The system also determines a first vector for a region of the first scale representative of a surface based on the coordinates of the first scale. Also, the system interpolates pixel locations in the second scale by scaling the coordinates of points of the first scale and computing a scaled second vector. A third vector is determined based, at least in part, upon the product of the first vector and the second vector, where the third vector has uneven scaling of its terms. A plurality of the terms of the third vector based upon a fractional scaling factor related to said uneven scaling and summing the components of the third vector.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Digital zooming or image scaling involves two components, namely, a coordinate transform which maps pixel locations in the zoomed coordinate system to points in the original coordinate system of the image, and a function interpolation which computes a consistent image value for each point mapped to the original image space.

Figure 5:
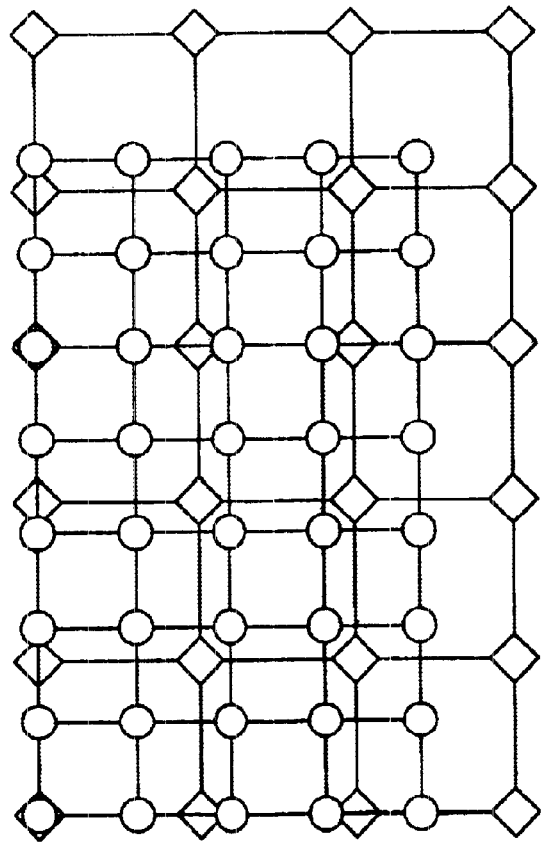
FIG. 5 illustrates a pure scaling of two superimposed coordinate systems scaled relative to one another.

Referring to FIG. 5, an illustration of both enlargement and reduction is provided. For the case of enlargement the pixel centers of the original coordinate system are marked by diamonds, those of the zoomed coordinate system are marked by circles. The origin is taken as the upper left corner. It may be observed that because this transformation represents a magnification greater than 100% (approximately 167% in this example) there are more zoomed pixels per unit area in the original system. By definition, pixel values exist a priori only at diamond locations (corresponding to pixels of the original image); and therefore image values must be explicitly computed for any circle location not coincident with a diamond. In the case of reduction, pixels of the original coordinate system are marked by circles and those of the reduced coordinate system are marked by diamonds. Because the magnification is less than 100% (approximately 60% in this example) there are fewer un-zoomed pixels per unit area in the original system. Again, pixel values exist only at original pixel locations (circles in this case) and values must be explicitly computed for any diamonds not coincident with a circle.

Typically the coordinate transform of interest for mapping one 2-dimensional coordinate system to another is an affine transformation. Affine transformations are a family of linear transformations on homogeneous coordinates, as denoted by:

$$A \cdot \begin{bmatrix} x' \\ y' \\ 1 \end{bmatrix} = \begin{bmatrix} x \\ y \\ 1 \end{bmatrix}$$

In general an affine transformation consists of scaling, shearing, rotation, and translation components. These components may be represented by separate matrixes, namely, S, Z, R, and T, respectively.

$$A = S \cdot Z \cdot R \cdot T = \begin{bmatrix} s_x & 0 & 0 \\ 0 & s_y & 0 \\ 0 & 0 & 1 \end{bmatrix} \cdot \begin{bmatrix} 1 & z & 0 \\ 0 & 1 & 0 \\ 0 & 0 & 1 \end{bmatrix} \cdot \begin{bmatrix} \cos\theta & \sin\theta & 0 \\ -\sin\theta & \cos\theta & 0 \\ 0 & 0 & 1 \end{bmatrix} \cdot \begin{bmatrix} 1 & 0 & t_x \\ 0 & 1 & t_y \\ 0 & 0 & 1 \end{bmatrix}$$

It is important to note that affine transformations are uniform over the entire range, i.e., they are independent of the image data itself. In addition, any of the matrixes of an affine transformation may be an identity matrix. This means that having the position of any point of the image plus the two direction vectors of the coordinate axes, one may compute the position of any other point through vector addition. Accordingly, vector addition may be used to compute the location of any point once an initial point is known, which is fast and computationally efficient. This represents a substantial increase in computational efficiently by only having to perform the inverse transformation of A once.

Figure 2:
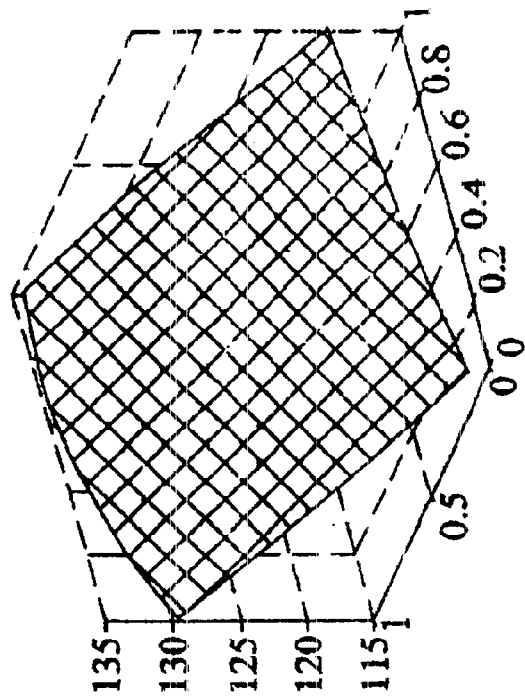
FIG. 2 is a detail of the central 2×2 neighborhood of FIG. 1.
Figure 1:
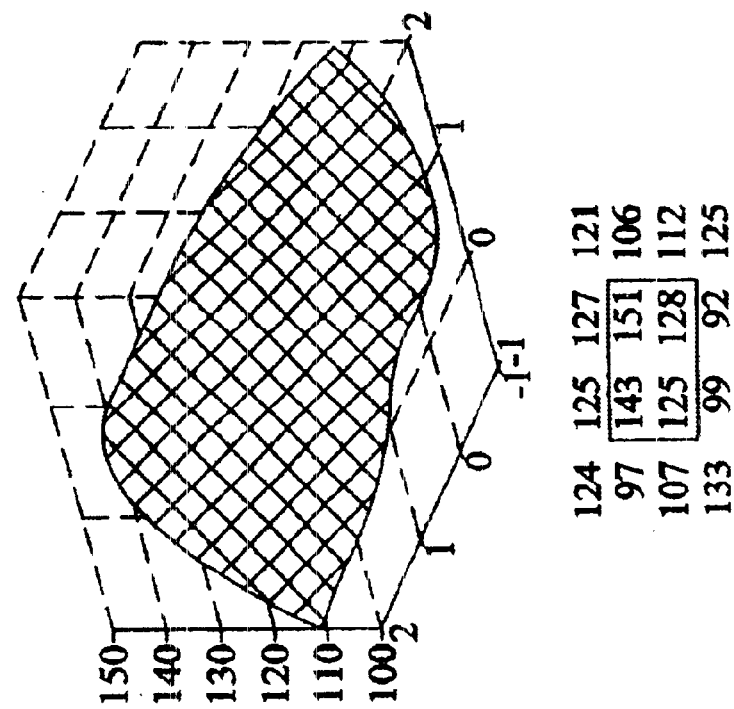
FIG. 1 is a bicubic surface fit to a representative 4×4 neighborhood.
Figure 3:
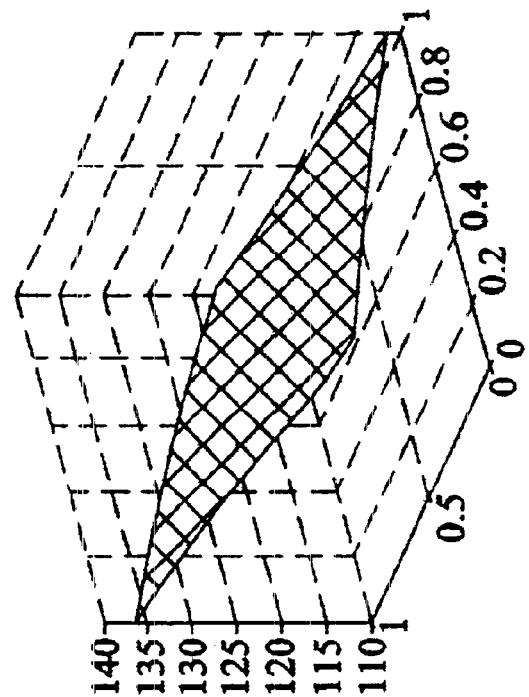
FIG. 3 is a surface fit of an over-determined system illustrating discontinuities.
Figure 3:
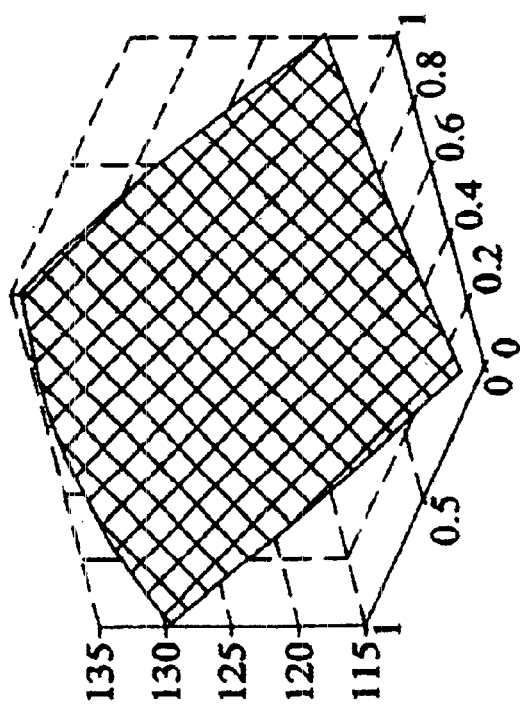
Figure 4:
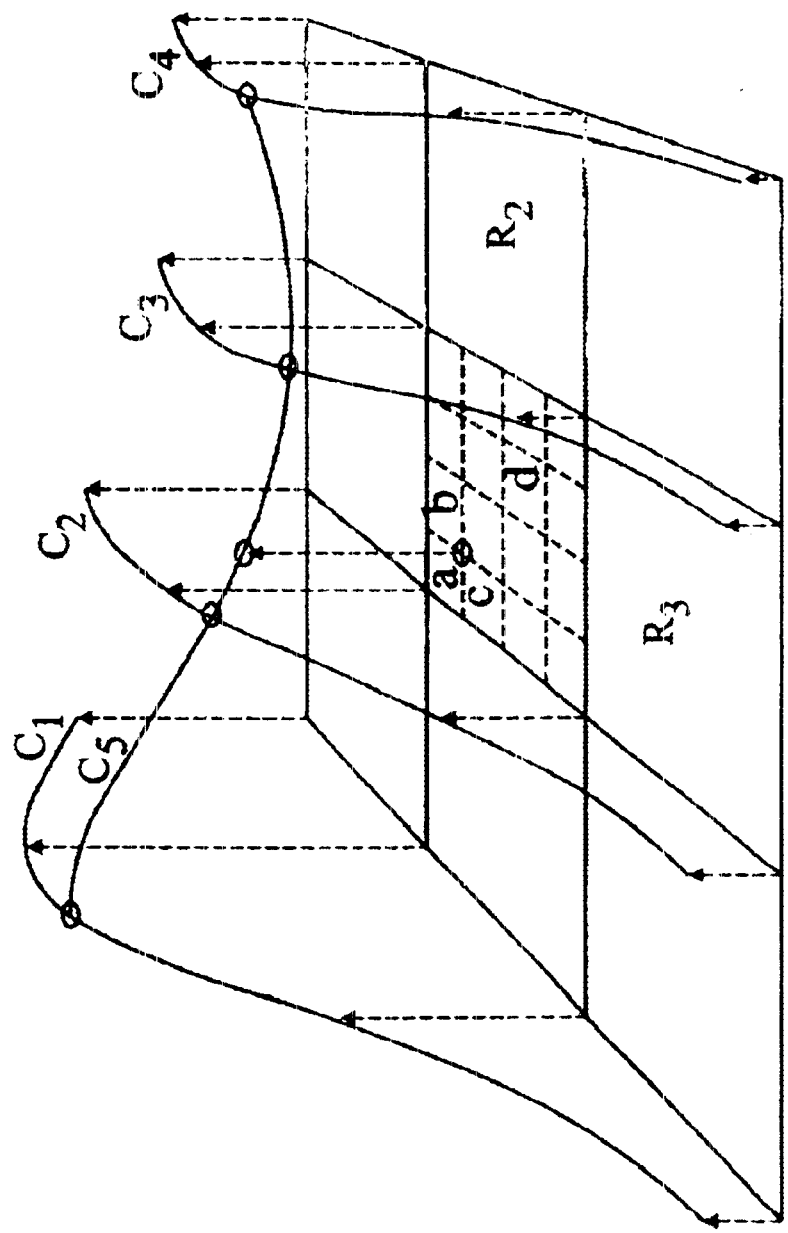
FIG. 4 illustrates an image interpolation using profile curves.
Figure 6:
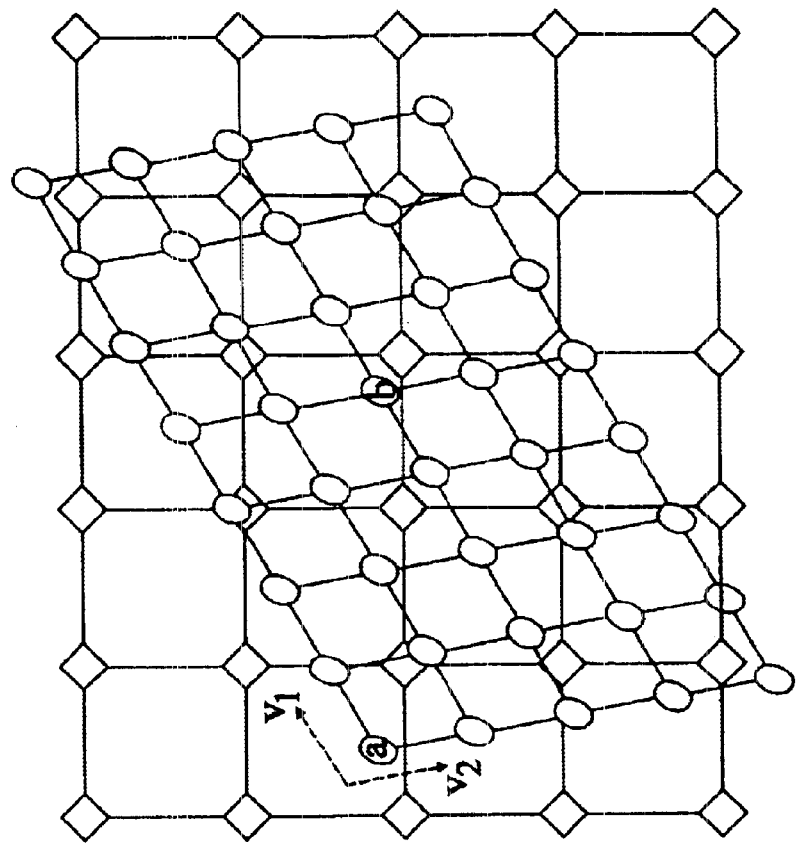
FIG. 6 illustrates a general affine transformation composed of scaling, skewing, rotation, and translation.

Referring to FIG. 6, a general affine transformation of one image coordinate system relative to another is illustrated. With respect to the diamond coordinate system, having the position of point "a" and the direction vectors ($v_1, v_2$), the position of point "b" is obtained as: $b = a + 4v_1 + 2v_2$. As may be observed, this calculation is mathematically simple requiring only multiple additions. It is also noted that "a", $v_1$, and $v_2$, are only computed once per image.

For digital zooming, the affine transformation may be reduced by assuming there is no shear, namely, $z = \theta = t_x = t_y = 0$. In addition uniform scaling may be assumed, if desired, as $s_x = s_y$. If zooming is about a default origin (e.g., the upper left corner of the copier platen), then $A = S$. Thus to find the coordinates of a zoomed pixel in the original image coordinates the only calculation that is necessary is to compute the inverse of S.

$$\begin{bmatrix} x' \\ y' \\ 1 \end{bmatrix} = S^{-1} \cdot \begin{bmatrix} x \\ y \\ 1 \end{bmatrix} = \begin{bmatrix} 1/s & 0 & 0 \\ 0 & 1/s & 0 \\ 0 & 0 & 1 \end{bmatrix} \cdot \begin{bmatrix} x \\ y \\ 1 \end{bmatrix}$$

If the desire is to support zooming about an arbitrary point, $x_c, y_c$, then the equation becomes the following.

$$A = T^{-1} \cdot S \cdot T = \begin{bmatrix} 1 & 0 & x_c \\ 0 & 1 & y_c \\ 0 & 0 & 1 \end{bmatrix} \cdot \begin{bmatrix} s & 0 & 0 \\ 0 & s & 0 \\ 0 & 0 & 1 \end{bmatrix} \cdot \begin{bmatrix} 1 & 0 & -x_c \\ 0 & 1 & -y_c \\ 0 & 0 & 1 \end{bmatrix} = \begin{bmatrix} s & 0 & x_c(1-s) \\ 0 & s & y_c(1-s) \\ 0 & 0 & 1 \end{bmatrix} \text{ and } A^{-1} = \begin{bmatrix} 1/s & 0 & x_c - \frac{x_c}{s} \\ 0 & 1/s & y_c - \frac{y_c}{s} \\ 0 & 0 & 1 \end{bmatrix}.$$

In either case, merely the inverse of A ($A^{-1}$) is calculated once for a particular mapping and because $A^{-1}$ does not depend on the image data it may be computed once for the entire image.

Figure 7:
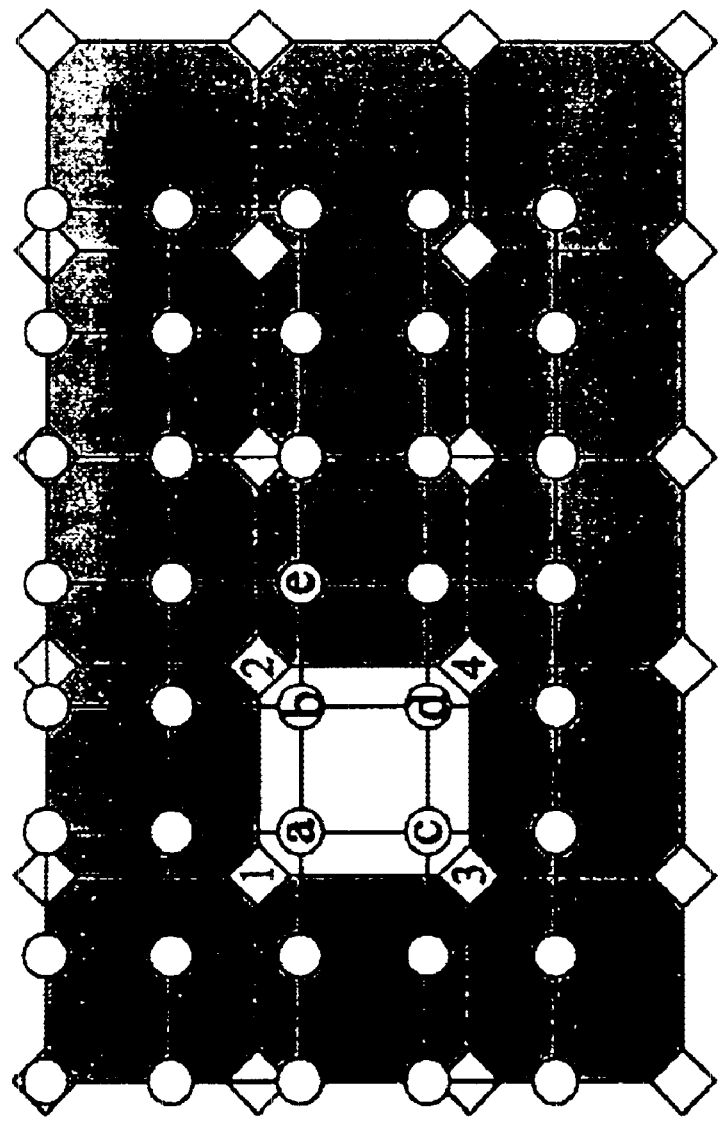
FIG. 7 illustrates pure scaling with pixel neighborhood 1, 2, 3, 4 interpolated.

Referring to FIG. 7, an example of pure scaling is shown. Assume, without loss of generality, that the original image coordinate system is marked by the diamonds and that the circles indicate an enlarged coordinate system. Because the coordinate axes of the two systems are aligned, the axes direction vectors can be captured by simple scalar offsets: $v_1=(\Delta_x,0) \rightarrow \Delta_x$ $v_2=(0, \Delta_y) \rightarrow \Delta_y$. Thus, points in the region are obtained by applying the proper scalar offsets to a given point: $b_x=a_x+\Delta_x$, $c_y=a_y+\Delta_y$, ($b_y=a_y$, $c_x=a_x$), etc. Further, assume that the neighborhood of pixels labeled (1,2,3,4) has been interpolated with a 2-dimensional implicit polynomial of the form:

$$f(x, y) = v_1 + v_2 x + v_3 y + \ldots + v_{n-d} x^d + v_{n-d+1} x^{d-1} y + \ldots +$$
$$v_{n-1} x y^{d-1} + v_n y^d$$
$$= (v_1, v_2, v_3, \ldots, v_{n-d}, v_{n-d+1}, \ldots, v_{n-1}, v_N) \cdot$$
$$(1, x, y, \ldots, x^d, x^{d-1} y, \ldots, x y^{d-1}, y^d) = V^T X = X^T V$$

The equation f(x,y) is representative of a surface. The v's are representative of a particular surface for a neighborhood. In other words, the v's represent which surface of a family of surfaces is represented. The of x's and y's change point-to-point within an image and expresses a family of surfaces of a particular type. The format of the equation remains the same across the entire image with the changing coefficients indicating where on that particular surface is represented. In this manner all the coefficients of the surface in vector V are known and that to find the value at any point within the neighborhood (e.g., at a, b, c, d), it is necessary only to evaluate the vector of monomials X for the coordinates of the point (x,y) and then to compute the inner product $V^T X$. For a 2-dimensional polynomial of degree d, each vector has $m=(d+1)(d+2)/2$ elements. Thus, the evaluation of X entails m−3 multiples, e.g., 7 multiples for a bicubic. Evaluation of the inner product entails m−1 multiples and an identical number of additions, i.e., 9 multiples and 9 adds for a bicubic.

On the other had, to determine the value of any point outside the neighborhood (e.g., point e in FIG. 7) entails first computing the coefficients in vector V for the new neighborhood. This can be performed efficiently, as will be discussed later, but it nevertheless entails computational expense beyond that of evaluating points on an existing surface. Furthermore, if after evaluating an exterior point (e.g., e) one desires the value at a point in the earlier neighborhood (e.g., c), the neighborhood surface is refit in order to recover the earlier vector V (or otherwise saved). Therefore, having fit an interpolant to a pixel neighborhood, it is advantageous to present all new points in the current neighborhood for evaluation before considering points in another neighborhood.

The objective of partitioned-integer coordinates is to permit addressing of points within the unit rectangle using only integers. The unit rectangle represents the local coordinate system of a 2×2 pixel neighborhood, where the bounding pixels are located at (0,0), (1,0), (0,1), and (1,1) in pixel units. It is to be understood that any sized neighborhood may be used. Clearly, any interior point will have fractional coordinates. However, the present inventor realized that if the unit rectangle is "scaled" by some integral value, then the addressing of a fixed set of locations within the unit rectangle may be done with integer coordinates. In particular, a scale factor of sf will permit integer addressing of $sf^2$ locations. Picking a power of two ($2\phi$) allows the scaling to be accomplished by shift operations alone, which is computationally efficient. This is equivalent to partitioning a coordinate number into a whole part and a fractional part. For a 32 bit integer, the fractional part of the coordinate consists of the low-order $\phi$ bits and the whole part is represented by the 32-$\phi$ high-order bits (possibly including a sign bit).

In choosing a fractional scale-factor, it is important to achieve a compromise between spatial resolution and the power series as expressed in the vector of monomial basis functions, X. More bits means greater spatial resolution, but for higher degree interpolants they can also overflow the integer since high-order terms require $d\phi$ bits. In addition, there must be sufficient headroom to accommodate the inner product $V^T X$.

In solving for the coefficient vector V it is undesirable to scale the coordinates of the pixel neighborhood itself as this yields a numerically unstable system, precisely because scaling causes the higher-order terms to grow much faster than the constant terms. Such scaling also tends to produce surfaces with distorted curvature, since points further from the origin increasingly dominate the shape of the interpolated surface as an increasing scale factor pushes them further out. If the pixel values of such distant points are significantly different from those closer to the origin, the surface curvatures will be magnified. Therefore, the present inventor determined that it is preferable to solve for V in the un-scaled, but local, integer coordinates of the pixel grid.

It is also important to note that the vector of monomials is unevenly scaled: linear terms are scaled by $2\phi$, quadratic terms by $2^{2\phi}$, cubic terms by $2^{3\phi}$, etc. Therefore, care must be taken to preserve these distinctions and to undo the scaling at the proper time. The present inventor determined that it is preferable to compute the individual components of $V^T X$ and then to rescale each by the appropriate scale factor as stored in a vector of scale factors $\phi$ before summing the resulting components. This has the added benefit of avoiding overflow in the summation.

Polynomial interpolation of images provides a piecewise continuous approximation to the discretely sampled image function. Such sampling means that image values are directly available only for points on the integer pixel lattice, and these values are assumed to be exact. The choice of the degree of the interpolant reflects assumptions about the behavior of the image function within each neighborhood. This parameter may be under user or program control.

The following aspects to the image scaling are preferably employed.

(0) Off line, pre-compute the degree d solution matrices using local unit rectangle coordinates. This computation yields a unique sparse system for each desired degree (1–4): {$M_1$ (linear), $M_2$ (quadratic), $M_3$ (cubic), $M_4$. By choosing an appropriate scale-factor $ms_d$, each of these matrices can be represented as an integer system. These matrices depend only on the degree of the interpolant, the local coordinate system that is used, and the points chosen in this local coordinate frame. These matrices do not depend on the image data or the coordinate scale-factor.

(1) At each pixel neighborhood the local coefficient vector is solved: $V_d(r,c)=M_d P(r,c)$. This integer vector depends on the degree d of the interpolant and the local neighborhood of pixel values: P(r,c), where (r,c) indicates the origin of the pixel neighborhood.

(2) At each interpolated location the local coordinates of point (x,y) are scaled by the selected coordinate scale-factor $\phi$ and the scaled monomial vector $X_d$ is computed, e.g., for a bicubic $X_3=(1,x,y,x^2,xy,y^2,x^3x^2y,xy^2,y^3)$ This integer vector depends on the degree of the interpolant, the local coordinates of the particular point, and the coordinate scale-factor.

(3) The individual components of $V^T X : V_d x X_d$, where x indicates component-wise multiplication are computed. The result is an integer vector with uneven scaling of its terms.

(4) Each component based on its power term is rescaled using the fractional scaling vector $\phi d$, e.g., for cubics $\phi_3=(0,\phi,\phi,2\phi,2\phi,2\phi,3\phi,3\phi,3\phi,3\phi)$ This involves component-wise shift operations, and here again the result is an integer vector.

(5) The components of the resulting vector are added and rescaled by the matrix scale factor: $ms_d$.

By way of example, the complete partitioned-integer, bicubic computation of pixel value I at point (x,y) is thus given by:

$$I_3(x, y) = \frac{\sum [(V_{3\bullet} \times X_3)_\bullet \to \Phi_3]}{ms_3}$$

Here $.\to$ indicates a component-wise right shift of the elements of the left-hand vector by the number of bits indicated in the elements of the right-hand vector. Note that the final division by can be accomplished by a multiplication and a shift.

The one step that is thus far missing in the exposition of the interpolation method is to provide the precomputed matrices $\{M_1,M_2,M_3,M_4\}$. In each case, M is the inverse of a matrix A satisfying AV=P for a given degree of polynomial. These matrices depend on the particular points selected from the pixel neighborhood and are chosen so as to produce matrices composed of small integer elements.

Point configurations are specified with respect to Cartesian coordinates as indicated in the following diagram of local coordinate column-row pairs. The dashed lines indicate pixel boundaries; the solid lines parallel the axes or 0-lines and delimit the first quadrant pixels.

| (−1,2)  | (0,2)  | (1,2)  | (2,2)  |
| (−1,1)  | (0,1)  | (1,1)  | (1,2)  |
| (−1,0)  | (0,0)  | (1,0)  | (2,0)  |
| (−1,−1) | (0,−1) | (1,−1) | (2,−1) |

For image data in scanline order a vertical flip of the configurations (not the matrices) is employed. Also, it should be noted that each point configuration presented here actually represents a family of configurations obtained by 90° rotations and vertical and horizontal flips of the given configurations.

Since in this example the central 2×2 pixel neighborhood is interpolated, all preferred configurations contain the central 4 pixels. As additional points are added for higher-order interpolants, those along the 0-lines are preferred since they lead to sparse systems. Points closer to the origin are also favored since they lead to matrices with small integer elements thereby using fewer bits. Compactness and symmetry of configuration are also favored which better ensures the geometric integrity of the resulting interpolant.

For purposes of illustration and without loss of generality, assume 8-bit unsigned pixel data and a 32-bit signed integer package in the following analysis. In such cases, allowing for a sign bit leaves 31 bits available for numerical and spatial resolution.

Fitting a bilinear surface requires exactly 4 points, and there is exactly 1 configuration containing the central 4 pixels. The single preferred configuration is:

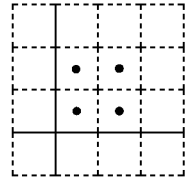

The resulting matrix and the corresponding point vector are:

$$M_1 = \begin{bmatrix} 1 & 0 & 0 & 0 \\ -1 & 1 & 0 & 0 \\ -1 & 0 & 1 & 0 \\ 1 & -1 & -1 & 1 \end{bmatrix} \quad P(r,c) = \begin{bmatrix} p(r,c) \\ p(r,c+1) \\ p(r+1,c) \\ p(r+1,c+1) \end{bmatrix}$$

Evaluation of $V_1(r,c)=M_1 P(r,c)$ thus requires 0 multiplies, 5 adds, and 8 bits to represent. Evaluating $X_1=(1,x,y,xy)^T$ requires a single multiplication and can accommodate 22 bits of resolution per coordinate axis. Finally, evaluating $V^T X$ entails 3 multiplies and 3 adds. Thus, it requires 5 adds to compute the bilinear surface interpolant for a given neighborhood. Each point to be interpolated on that surface requires an additional 4 multiplies and 3 adds.

Fitting a biquadratic surface entails selecting exactly 6 points. If these points are chosen from the 3×3 pixel neighborhood of the first quadrant containing the center 4 pixels, there are a total of 10 possible configurations. Of these, only 8 produce non-singular systems. In trying to maximize sparseness, one ends up with the single preferred configuration that selects the 2 remaining points along the 0-lines:

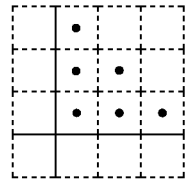

The resulting matrix and the corresponding point vector are:

$$M_2 = \frac{1}{2}\begin{bmatrix} 2 & 0 & 0 & 0 & 0 & 0 \\ 1 & 0 & 0 & -2 & 0 & 1 \\ -3 & 4 & -1 & 0 & 0 & 0 \\ -3 & 0 & 0 & 4 & 0 & -1 \\ 1 & -2 & 1 & 0 & 0 & 0 \\ 2 & -2 & 0 & 2 & 2 & 0 \end{bmatrix} P(r,c) = \begin{bmatrix} p(r,c) \\ p(r,c+1) \\ p(r,c+2) \\ p(r+1,c) \\ p(r+1,c+1) \\ p(r+2,c) \end{bmatrix}$$

Here evaluation of $V_2(r,c)=M_2 P(r,c,)$ requires 11 multiples and 11 adds, and 10 bits to represent. Actually, all but 2 of the multiplies can be performed as shifts. Evaluating $X_2=(1,x,y,x^2,xy,y^2)^T$ requires 3 multiplies and can accommodate 10 bits of resolution per coordinate axis. Finally, evaluating $V^T X$ entails 5 multiples, 5 adds, and a final shift to undo the matrix scaling. Therefore, the local biquadratic surface interpolant can be computed with 2 multiplies, 11 adds, and 9 shifts. Each point in the neighborhood can be computed with 8 multiplies, 5 adds, and 1 shift.

Fitting a bicubic surface requires exactly 10 points. There are a total of 8008 configurations of 10 points from the 16 points in the 4×4 pixel neighborhood diagrammed above. Of these, there are 924 which contain the central 4 pixels, and only 728 produce non-singular systems. Again applying the sparseness goal, one can add 4 points along the 0-lines, yielding 28 total and 25 non-singular configurations, based on the following set of 8 points.

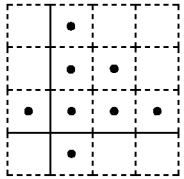

Of these 25, only the following 3 configurations are symmetric:

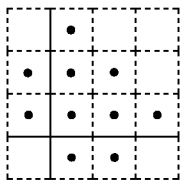

a

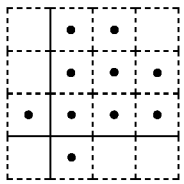

b

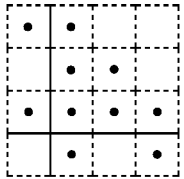

c

Compactness favors the first two. However, configurations a, b, and c, respectively, produce matrices with 3-, 5-, and 4-bit entries. Therefore, a is the preferred configuration; its matrix and point vector are:

$$M_2 = \frac{1}{6}\begin{bmatrix} 0 & 0 & 0 & 6 & 0 & 0 & 0 & 0 & 0 & 0 \\ 0 & 0 & -2 & -3 & 6 & -1 & 0 & 0 & 0 & 0 \\ -2 & 0 & 0 & -3 & 0 & 0 & 0 & 6 & 0 & -1 \\ 0 & 0 & 3 & -6 & 3 & 0 & 0 & 0 & 0 & 0 \\ 3 & -3 & 3 & -6 & 3 & 0 & -3 & 3 & 0 & 0 \\ 3 & 0 & 0 & -6 & 0 & 0 & 0 & 3 & 0 & 0 \\ 0 & 0 & -1 & 3 & -3 & 1 & 0 & 0 & 0 & 0 \\ 0 & 0 & -3 & 6 & -3 & 0 & 3 & -6 & 3 & 0 \\ -3 & 3 & 0 & 6 & -6 & 0 & 0 & -3 & 3 & 0 \\ -1 & 0 & 0 & 3 & 0 & 0 & 0 & -3 & 0 & 1 \end{bmatrix} P(r,c) =$$

$$\begin{bmatrix} p(r-1, c) \\ p(r-1, c+1) \\ p(r, c-1) \\ p(r, c) \\ p(r, c+1) \\ p(r, c+2) \\ p(r+1, c-1) \\ p(r+1, c) \\ p(r+1, c+1) \\ p(r+2, c) \end{bmatrix}$$

Evaluation of $V_3(r,c)=M_3P(r,c)$ thus requires 34 multiplies, 32 adds, and 2 shifts; and it uses 11 bits in its representation. Evaluating $X_3=(1,x,y,x^2,xy,y^2,x^3,x^2y,xy^2,y^3)^T$ requires 7 multiplies and can accommodate 6 bits of resolution per coordinate axis. Finally, evaluating $V^T X$ entails 9 multiplies and 9 adds. The division required to undo the matrix scaling can be done as a multiply and a shift. Thus, it requires 34 multiplies, 32 adds, and 2 shifts to compute the bicubic surface interpolant for a given neighborhood. Each point in the neighborhood is then computed with 17 multiplies, 9 adds, and 1 shift.

To fit a biquartic polynomial requires exactly 15 points, and since there are no non-singular configurations in the 4×4 neighborhood given above, it is preferable to expand it to a 5×5 from (-2,-2) to (2,2). The system may then constrain its configurations to include the 0-lines and the central 3×3 as shown here:

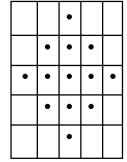

Of the 66 possible configurations, 48 are non-singular and only the following 3 are symmetric and compact:

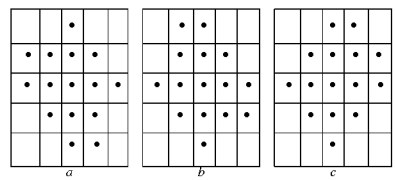

There is no numerical reason for selecting any of the 3 configurations (each requires 5 bits); in fact the matrices for a and c are identical. Since configuration c is the most compact, it is preferred and its matrix is as follows:

$$M_4 =$$

$$\frac{1}{24}\begin{bmatrix} 0 & 0 & 0 & 0 & 0 & 0 & 0 & 24 & 0 & 0 & 0 & 0 & 0 & 0 & 0 \\ 0 & 0 & 0 & 0 & 0 & 2 & -16 & 0 & 16 & -2 & 0 & 0 & 0 & 0 & 0 \\ 2 & 0 & 0 & -16 & 0 & 0 & 0 & 0 & 0 & 0 & 0 & 0 & 16 & 0 & -2 \\ 0 & 0 & 0 & 0 & 0 & -1 & 16 & -30 & 16 & -1 & 0 & 0 & 0 & 0 & 0 \\ -4 & 4 & 6 & 12 & -18 & -4 & 12 & -24 & 16 & 0 & 4 & -18 & 16 & -2 & 0 \\ -1 & 0 & 0 & 16 & 0 & 0 & 0 & -30 & 0 & 0 & 0 & 0 & 16 & 0 & -1 \\ 0 & 0 & 0 & 0 & 0 & -2 & 4 & 0 & -4 & 2 & 0 & 0 & 0 & 0 & 0 \\ 0 & 0 & -6 & 12 & -6 & 0 & 0 & 0 & 0 & 0 & 0 & 6 & -12 & 6 & 0 \\ 0 & 0 & -6 & 0 & 6 & 0 & 12 & 0 & -12 & 0 & 0 & -6 & 0 & 6 & 0 \\ -2 & 0 & 0 & 4 & 0 & 0 & 0 & 0 & 0 & 0 & 0 & 0 & -4 & 0 & 2 \\ 0 & 0 & 0 & 0 & 0 & 1 & -4 & 6 & -4 & 1 & 0 & 0 & 0 & 0 & 0 \\ 0 & 0 & 0 & 0 & 0 & 4 & -12 & 12 & -4 & 0 & -4 & 12 & -12 & 4 & 0 \\ 0 & 0 & 6 & -12 & 6 & 0 & -12 & 24 & -12 & 0 & 0 & 6 & -12 & 6 & 0 \\ 4 & -4 & 0 & -12 & 12 & 0 & 0 & 12 & -12 & 0 & 0 & 0 & -4 & 4 & 0 \\ 1 & 0 & 0 & -4 & 0 & 0 & 0 & 6 & 0 & 0 & 0 & 0 & -4 & 0 & 1 \end{bmatrix}$$

Evaluation of $V_4(r,c)=M_4 P(r,c)$ thus requires 40 multiplies, 72 adds, and 47 shifts; and it uses 13 bits in its representation. Evaluating $X_4(1,x,y,x^2,xy,y^2,x^3,x^2y,xy^2,y^3,x^4,x^3y,x^2y^2, xy^3,y^4)^T$ requires 12 multiplies and can accommodate only 4 bits of resolution per coordinate axis. Finally, evaluating $V^T X$ entails 14 multiplies and 14 adds. Here also the division required to undo the matrix scaling can be done as a multiply and a shift. Thus, it requires 40 multiplies, 72 adds, and 47 shifts to compute the bicubic surface interpolant for a given neighborhood. Each point in the neighborhood is then computed with 27 multiplies, 14 adds, and 1 shift.

The reduced spatial resolution and the high computational cost of evaluation may make use of biquartic interpolants prohibitive, except perhaps in cases where rapid changes in the data warrant the additional shape flexibility that such high-degree polynomials afford.

In the context of digital copiers, a user specifies a desired copy magnification $s_m$, typically a small integer from a restricted range of percentages (e.g., 25%–400%). This may be composed with internal scale factors such as $s_o, s_p, \ldots$ (respectively representing optical-scale correction, printer-resolution conversion, etc.) to yield a comprehensive scale factor $s=(s_m \otimes s_o \otimes s_p \otimes \ldots)$ for the entire image. Note that from the user's perspective, magnification is uniform in both directions although the internal scale factors may not be. In this case s is actually a vector $s=(s_x,s_y)$.

Another important parameter is the degree d of interpolant, and this may be either globally determined or locally varied, based upon image content as computed by the copier's image-processing algorithms. Given the integer bitwidth of the target architecture $\beta_z$, the bitwidth of the degree d matrix $\beta_{Md}$, and the bitwidth of the pixel data $\beta_p$, the coordinate scale-factor for dimension d is bounded by:

$$\varphi = \varphi_d \le \left\lfloor \frac{\beta_z - (\beta_{Md} + \beta_p)}{d} \right\rfloor.$$

Thus, the preferred set of integer matrices ($M_1, M_2, M_3, M_4$), the corresponding matrix scale-factors ($ms_1, ms_2, ms_3, ms_4$), and the scaling vectors $\phi_d = (0, \phi, \phi, 2\phi, \ldots)$ may all be computed offline and stored for indexed retrieval according to degree.

With these predetermined values, the system may compute the direction offsets of an output unit and the active output image area in partitioned-integer input coordinates. This initialization is illustrated in the following code fragment. The active area ((x0 y0)(lastx lasty)) is the intersection of the scaled output-image rectangle with the scaled input-image rectangle. The center of the scaling (xc, yc) is expressed in unscaled output coordinates. For simplicity, the scalar version is shown, but if the scaling is non-uniform and s is a vector, then so is $\Delta$ and the corresponding operations.

```
//Initialization for scaling about center (xc, yc)
//using composite scale factor s given as percent.
Δ = DIVk(100 ← φ, s);
[offx offy] = [xc yc] * Δ
[x0 y0] = [xc yc] - [offx offy];
lasty = MIN(numRows ← φ, numRows * Δ + y0);
lastx = MIN(numCols ← φ, numCols * Δ + x0);
[outr outc] = [0 0];    //Start output image data at (0, 0)
```

In solving for $\Delta$, the floating point version would entail a division: $\Delta=100/s$. However, for partitioned integers, this operation can realized by a multiplication and a shift. This is what is meant by the macro DIVk(n,s), which for some numerical scale factor k expands to [(n·sk)+mid]→k. Here sk is an appropriate multiplier for which the expression equals n/s. The addition of the constant mid=1←(k−1) performs a sort of rounding operation, selecting the nearest integer. The fact that this example presents scaling in terms of percents in no way limits this method. If smaller scale factors are required (e.g., tenths of a percent), a number greater than 100 would be used.

Because of differences in point presentation, different code is used for enlargement and reduction. The code fragment shown below illustrates the scaling process for a uniform enlargement about an arbitrary center. Here the two outer loops are used to visit every relevant input pixel neighborhood. Each neighborhood in turn is fit with the appropriate interpolating polynomial of degree d, as reflected in the coefficient vector $V=V_d(r,c)$. If the number of input rows is not known a priori, then the outer row loop runs until the input row buffer is empty.

Two inner loops visit all output points, which are interior to the current 2×2 pixel neighborhood. At each such point (x,y), the corresponding vector of monomials for degree d is generated as $X=X_d(x,y)$. The interpolating surface is then evaluated by computing the progressively scaled inner product $V^T X$. Here the symbol .→ indicates the element-wise right shift of the left-hand operand by the number of bits indicated in the corresponding element of the right-hand operand; if the right-hand operand is a scalar it is used for all elements. Likewise, .x indicates element-wise multiplication. The variable newx marks the next scaled output, location to be used along this input row. Similarly, newy marks the next scaled output location for the following input row.

```
//Enlarge about center (xc, yc) using uniform scale
//factor s given as percent
[newx newy] = [x0 y0]; //Marks the new relative output
//positions
//Restore iteration bounds to unscaled input coords
[x0 y0] = [x0 y0] .→ ϕ;
[lastx lasty] = [lastx lasty] .→ ϕ;
//Iterate over all input neighborhoods
for(r=y0; r<lasty; ++r){
    for(c=x0; c<lastx; ++c){
        //Compute coefficient vector for degree d
        //interpolant
        //on neighborhood (r,c)
        V = Compute Vd(r,c);
        //Iterate over all output locations in this pixel
        //neighborhood
        for(yy=newy, rr=outr; yy<r+1; yy+=Δ, ++rr){
            for(xx=newx, cc=outc; xx<c+1; xx+=Δ, ++cc){
                //Use local coordinates
                y = yy - r; x = xx - c;
                if((y == 0 || y == 1) && ((x == 0 || x == 1))
                    val = InImage[yy, xx];
                else{
                    // Compute monomial vector of degree d for
                    // (x,y)
                    X = Compute Xd(x, y);
                    //compute the resulting pixel value
                    //for (x,y) using progressive rescaling
                    val = DIVk(Σ[(V' .* X) .→ ϕd], msd);
                }
                //Store result in the output image
                OutImage[rr, cc] = val;
            }
        }
        new x=xx;
        outc=cc;
    }
    newy = yy; newx = x0;
    outr = rr; outc = 0;
}
```

Point presentation is slightly simpler for reduction. Because the output point grid is sparser than the input grid, each 2×2 input pixel neighborhood contains at most one output location. This means that the two inner loops (used in the case of enlargement visit all output points within the current neighborhood) are not necessary. Furthermore, not every neighborhood contains an output location. In fact, for a scale factor of s%, only about $s^2$% of the neighborhoods contain an output point. For example, with s=99% at most 98% of the neighborhoods contain a point; for s=25%, the number of populated neighborhoods shrinks to 6.25%. These numbers are even smaller, if neighborhoods containing coincident output and input points are subtracted, since the values of such points do not require interpolation. Indeed, for values of s that yield integral values for Δ, no interpolation is required at all since all output points are coincident with the input grid. The following code fragment illustrates how to handle reduction, which simply iterates over the scaled output locations falling within the input image and interpolate values where required.

```
//Reduction about center (xc, yc) using uniform
//scale factor s given as percent
//Reduction may project outside of input data
for(y0; y0<0; y0+=Δ)       //Start within input data
for(x0; x0<0; X0+=Δ)       //Start within input data
// Iterate over the scaled output locations
for(yy=y0, rr=outr; yy<lasty; yy+=Δ, ++rr){
    for(xx=x0, cc=outc; xx<lastx; xx+=Δ, ++cc){
        r = yy ← ϕ; c = xx ← ϕ; //get unscaled input coords
        y = yy - r; x = xx - c; //use local coordinates
        //Test for coincidence with input grid
        if((y == 0 || y == 1) && ((x == 0 || X == 1))
            val = InImage[yy, xx];
        else{
            //Compute monomial vector of degree d for (x,y)
            X = Compute Xd(x, y);
            //Compute coefficient vector for degree d
            //interpolant on neighborhood (r,c)
            V = Compute Vd (r, c) ;
            //Compute the resulting pixel value for (x,y)
            //using progressive rescaling
            val=DIVk(Σ[(V' .* X) .→ ϕd], msd);
        }
        //Store result in the output image
        OutImage[rr, cc] = val;
    }
}
```

Another embodiment, described here, attempts to optimize the periodic nature of positional offsets. This periodicity is especially relevant for integral scale factors-i.e., multiples of 100%. FIG. 7 shows an output coordinate system marked by circles which has been enlarged by a factor of 300% relative to the input coordinate system marked by diamonds. Notice that all of the shaded output points have the same local coordinates (relative to the enclosing 2×2 input neighborhood). In fact for integral scale factors they are separated by a scaled input unit in each direction, i.e., Δ=1←ϕ.

If the pixel value at a point is formulated in terms of weighted contributions from its neighbors and if these weights are based solely on its local coordinates, then computing the weights for a particular local position allows their application at any other point with the same local coordinates. This of course assumes that the degree of interpolation is fixed for the entire image; it also assumes that the image data can be accessed in random order.

The present inventor realized that one important factor to achieve this optimization is to observe the following equivalence in how a new pixel value is computed:

$$I = V^T X = X^T V + X^T \cdot (M \cdot P) = X^T \cdot M \cdot P = (X^T \cdot M) \cdot P = W^T P$$

As defined previously, V is the vector of coefficients for a degree d interpolant, X is the corresponding vector of monomials, P is a vector of pixel values chosen according to the configurations described above, and M is one of the set of sparse matrices comprised of small integers: $M \in \{M_1, M_2, M_3, M_4\}$. So the computation of $W^T = X^T M$, and with these structures established, the steps in computing W are:

(0) In order to avoid truncation to 0, bit scale M by another factor $\phi_m$ and bit scale the local coordinates of point (x,y) and form the monomial vector X as above. Thus, $M = M_d \leftarrow \phi_m$ and $(x,y) = (x,y) \leftarrow \phi$. Note that the scaling of M was not necessary in the computation of V, because the product of M with P provided an implicit scaling based on the magnitudes of the pixel values.

(1) Column multiply X into M without summation as follows:

$$XM = X_* \times M = \begin{bmatrix} x_1 M_{1,1} & x_1 M_{1,2} & \cdots & x_1 M_{1,m} \\ x_2 M_{2,1} & x_2 M_{2,2} & \cdots & x_2 M_{2,m} \\ \vdots & \vdots & \ddots & \vdots \\ x_m M_{m,1} & x_1 M_{m,2} & \cdots & x_m M_{m,m} \end{bmatrix}$$

(2) Inverse scale each of the resulting columns of XM by power series scale vector $\phi$ as previously described.

(3) Sum each of the resulting columns to produce the particular weight vector $W=W_d(x,y)$ for any point with local coordinates (x,y).

(4) Now iterate over all input pixel neighborhoods (r,c) and compute the local inner product $W^TP$, inverse scaling $\phi_m$ then by $ms_d$. The result is the pixel value at the local output point (x,y) and is given by:

$$W^T P = \frac{[W_d(x,y) \cdot P(r,c)] \rightarrow \varphi_m}{ms_d}$$

(5) Store each result in the output image at pixel location (r·Δ+x,c·Δ+y).

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of modifying an image consisting of a plurality of pixels from a first scale to a second scale comprising:
    (a) determining an integer matrix that is independent of the values of said plurality of pixels;
    (b) determining a first vector for a region of said first scale representative of a surface based on the coordinates of said first scale;
    (c) interpolating pixel locations in said second scale by scaling the coordinates of points of said first scale and computing a scaled second vector;
    (d) determining a third vector based, at least in part, upon the product of said first vector and said second vector, where said third vector has uneven scaling of its terms;
    (e) modifying a plurality of the terms of said third vector based upon a fractional scaling factor related to said uneven scaling; and
    (f) summing the components of said third vector.

2. The method of claim 1 wherein said integer matrix is pre-computed.

3. The method of claim 1 wherein said integer matrix is of the form msd, where m is a scale factor and $s_d$ is a matrix of integers.

4. The method of claim 1 wherein said integer matrix is based upon at least the coordinates of said first scale.

5. The method of claim 4 wherein said integer matrix is based upon at least the degree of the interpolant of at least one of said first and second vectors.

6. The method of claim 5 wherein said integer matrix is based upon at least the points selected of said first scale.

7. The method of claim 1 wherein said integer matrix is based solely upon the degree of the interpolant of at least one of said first and second vectors, the coordinates of said first scale, and the points selected of said first scale.

8. The method of claim 1 wherein said modifying said first scale to said second scale is an affine transformation.

9. The method of claim 8 wherein said affine transformation includes scaling.

10. The method of claim 8 wherein said affine transformation includes translation.

11. The method of claim 8 wherein said affine transformation includes rotation.

12. The method of claim 8 wherein said affine transformation includes shearing.

13. The method of claim 1 wherein said first vector is of the form $(v_1, v_2, v_3, \ldots v_{n-d+1}, \ldots v_{n-1}, v_n)$.

14. The method of claim 13 wherein said vector is determined as: $V_d(r,c)=M_dP(r,c)$, where d is the degree of the interpolant of at least one of said first and second vectors, (r,c) indicates the origin of said region, and P(r,c) are pixel values of said first scale.

15. The method of claim 13 wherein said second vector is of the form $(1, x, y, \ldots, x^d, x^{d-1}y, \ldots, xy^{d-1}, y^d)$.

16. The method of claim 1 wherein said first vector has (d+1)(d+2)/2 elements, where d is the degree of a function used to represent the profile of the pixels of said first scale.

17. The method of claim 1 wherein said second vector has (d+1)(d+2)/2 elements, where d is the degree of a function used to represent the profile of the pixels of said second scale.

18. The method of claim 1 wherein said scaling the coordinates is by a power of two.

19. The method of claim 18 wherein said scaling is performed solely by shift operations.

20. The method of claim 1 wherein said second vector is a monomial vector.

21. The method of claim 20 wherein said second vector is of the form $(1, x, y, \ldots, x^d, x^{d-1}y, \ldots, xy^{d-1}, y^d)$.

22. The method of claim 20 wherein said second vector is based upon at least the degree of the interpolant of at least one of said first and second vectors.

23. The method of claim 22 wherein said second vector is based upon at least the coordinates of said first scale.

24. The method of claim 23 wherein said second vector is based upon at least said scaling.

25. The method of claim 1 wherein said second vector depends only on the degree of the interpolant of at least one of said first and second vectors, the coordinates of said first scale, and said scaling.

26. The method of claim 1 wherein said third vector is computed, at least in part, as $V^TX=X^TV$, where said V is of the form $(v_1, v_2, v_3, \ldots v_{n-d+1}, \ldots v_{n-1}, v_n)$ and X is of the form $(1, x, y, \ldots x^d, x^{d-1}y, \ldots, xy^{d-1}, y^d)$.

27. The method of claim 26 wherein said third vector is an integer vector.

28. The method of claim 1 wherein said third vector is a piecewise continuous approximation to a discretely sampled said plurality of pixels.

29. The method of claim 26 wherein said third vector is calculated as $V^TX$.

30. The method of claim 1 wherein said fractional scaling factor is a vector.

31. The method of claim 30 wherein said modification involves only shift operations.

32. The method of claim 30 wherein said fractional scaling factor includes a different value for each degree of the terms of said third vector.

33. The method of claim 32 wherein said fractional scaling factor is an integer vector.

34. The method of claim 1 further comprising the step of re-scaling the result of said summation by a factor of said integer matrix.

35. The method of claim 34 wherein said integer matrix is of the form msd, where m is said factor and $s_d$ is a matrix of integers.

* * * * *

UNITED STATES PATENT AND TRADEMARK OFFICE
CERTIFICATE OF CORRECTION

PATENT NO.    : 6,697,539 B1
DATED         : February 24, 2004
INVENTOR(S)   : John Dolan It is certified that error appears in the above-identified patent and that said Letters Patent is hereby corrected as shown below:

Column 4,
Line 33, change "computational efficiently" to -- computational efficiency --.

Column 5,
Line 44, change "on the other had," to -- on the other hand --.

Column 7,
Line 4, change "$X_3=(1,x,y,x^2,xy,y^2,x^3x^2y,xy^2,y^3)$"
to -- $X_3=(1,x,y,x^2,xy,y^2,x^3,x^2,y,xy^2,y^3)$ --.
Line 14, change "3ϕ) This" to -- 3ϕ). This --.

Column 8,
Line 17, change "and an short circuit" to -- and a short circuit --.
Lines 60 and 61, change "requires 11 multiples"" to -- requires 11 multiplies --.

Column 9,
Line 34, change "sur face and said" to -- surface and said --.
Line 60, change "$M_2=$" to -- $M_3=$ --.

Column 12,
Line 56, change "and an short circuit" to -- and a short circuit --.

Signed and Sealed this

Twenty-first Day of February, 2006

JON W. DUDAS
*Director of the United States Patent and Trademark Office*